United States Patent
Tajima et al.

(10) Patent No.: US 12,274,941 B2
(45) Date of Patent: Apr. 15, 2025

(54) NON-TRANSITORY STORAGE MEDIUM HAVING STORED THEREIN INFORMATION PROCESSING PROGRAM, INFORMATION PROCESSING APPARATUS, INFORMATION SYSTEM, AND INFORMATION PROCESSING METHOD FOR OUTPUTTING A MUSIC PIECE IN A GAME IN WHICH A PLURALITY OF PLAYERS PARTICIPATE

(71) Applicant: Nintendo Co., Ltd., Kyoto (JP)

(72) Inventors: Masaru Tajima, Kyoto (JP); Sayako Doi, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 269 days.

(21) Appl. No.: 17/981,118

(22) Filed: Nov. 4, 2022

(65) Prior Publication Data

US 2023/0146517 A1 May 11, 2023

(30) Foreign Application Priority Data

Nov. 5, 2021 (JP) ................................. 2021-181532

(51) Int. Cl.
*A63F 13/54* (2014.01)
*A63F 13/46* (2014.01)
(Continued)

(52) U.S. Cl.
CPC .............. *A63F 13/54* (2014.09); *A63F 13/46* (2014.09); *A63F 13/80* (2014.09);
(Continued)

(58) Field of Classification Search
CPC ........................ G10H 1/0025; G10H 2210/026
See application file for complete search history.

(56) References Cited

U.S. PATENT DOCUMENTS

| 7,794,325 B2 * | 9/2010 | Hawkins | ............ G06Q 30/0209 705/14.12 |
| 11,617,952 B1 * | 4/2023 | Sheng | ..................... A63F 13/40 463/35 |

(Continued)

OTHER PUBLICATIONS

Video: Big Brain academy: Brain vs. Brain (First Introduction video), Oct. 29, 2021, 12 pp., at URL: https://youtu.be/YaKojDXwWGw.

*Primary Examiner* — Lawrence S Galka
(74) *Attorney, Agent, or Firm* — Nixon & Vanderhye PC (57) ABSTRACT

An information processing apparatus capable of outputting a variety of background music according to game situations is provided.
The information processing apparatus comprises: a competitive game execution unit that executes a competitive game in which a plurality of players participate; a determining unit that determines at least one player among the plurality of players who satisfies a predetermined condition relating to the competitive game during the progress of the competitive game; and a music output device that outputs, during the progress of the competitive game, a first music piece associated with a player satisfying the predetermined conditions and output, after the first music piece, a second music piece to be selected regardless of a player satisfying the predetermined conditions, wherein the music output device, when a player satisfying the predetermined condition is replaced during the progress of the game, causes the first music piece associated with the player newly satisfying the predetermined condition to be output, and after the first music piece, causes a second music piece different from the second music piece included in a music piece that was output before the player was replaced.

20 Claims, 8 Drawing Sheets

(51) Int. Cl.
*A63F 13/67* (2014.01)
*A63F 13/79* (2014.01)
*A63F 13/80* (2014.01)
*A63F 13/87* (2014.01)

(52) U.S. Cl.
CPC ... *A63F 2300/6081* (2013.01); *A63F 2300/61* (2013.01); *A63F 2300/8017* (2013.01); *A63F 2300/8064* (2013.01)

(56) References Cited

U.S. PATENT DOCUMENTS

| | | | |
|---|---|---|---|
| 2003/0037664 A1* | 2/2003 | Comair | G10H 1/0025 84/609 |
| 2004/0214638 A1* | 10/2004 | Totaka | G10H 1/0025 463/35 |
| 2009/0082105 A1* | 3/2009 | Hegstrom | A63F 13/54 463/43 |
| 2017/0056772 A1* | 3/2017 | Eng | A63F 13/54 |
| 2020/0406144 A1* | 12/2020 | Estanislao | A63F 13/79 |

* cited by examiner

NON-TRANSITORY STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD FOR OUTPUTTING A MUSIC PIECE IN A GAME IN WHICH A PLURALITY OF PLAYERS PARTICIPATE

CROSS REFERENCE TO RELATED APPLICATION

This nonprovisional application is based on Japanese Patent Application No. 2021-181532 filed with the Japan Patent Office on Nov. 5, 2021, the entire contents of which are hereby incorporated by reference. The entire contents of which are hereby incorporated by reference.

FIELD

The present disclosure relates to a non-transitory storage medium having stored therein, an information processing program, an information processing apparatus, an information processing system, and an information processing method for performing information processing relating to the output of a music piece in a game in which a plurality of players participate.

BACKGROUND AND SUMMARY

In the past, background music (BGM) has been used in games, and games in which a music piece is selected and output in accordance with the game situation are known. In this way, the music piece is selected and output in accordance with the game situation. In this way, when trying to output music piece according to the game situation, it was necessary to create many pieces of music in advance when trying to prepare music pieces for various game situations (see, for example, https://www.youtube.com/watch?v=kQq22oYMTFo, which was valid at the time of the basic Japanese application but is no longer valid as of the filing date of this application, but similar content can be found at <https://youtu.be/YaKojDXwWGw> as of the filing date of this application).

One of the purposes of the present technology is to provide an information processing program, an information processing device, an information processing system, and an information processing method that can output a variety of BGM according to game situations.

A non-transitory storage medium in one aspect has stored therein an information processing program, the information processing program causes the computer to function as: a competitive game execution unit configured to execute a competitive game in which a plurality of players participate; a determining unit configured to determine at least one player among the plurality of players who satisfies a predetermined condition relating to the competitive game during the progress of the competitive game; and a music output unit configured to output, during the progress of the competitive game, a first music piece associated with a player satisfying the predetermined conditions and output, after the first music piece, a second music piece to be selected regardless of a player satisfying the predetermined conditions, wherein the music output unit is configured to, when a player satisfying the predetermined condition is replaced during the progress of the game, cause the first music piece associated with the player newly satisfying the predetermined condition to be output, and after the first music piece, cause a second music piece different from the second music piece included in a music piece that was output before the player was replaced.

According to this configuration, the BGM is changed each time a player who satisfies the predetermined conditions for a competitive game is replaced, so that the BGM can be output in accordance with the game situation. The player can feel the change in the progress of the game by the change of the BGM. Furthermore, according to the above configuration, as BGM, after outputting the first music piece associated with a player who satisfies the predetermined conditions for a competitive game, the second music piece, which is selected regardless of the player, is output, and the second music piece is changed each time a player who satisfies the predetermined conditions is replaced. Therefore, it is possible to provide a variety of BGM without having to create many music pieces to be used as BGM.

The information processing program stored in the non-transitory storage medium described above may further be configured to cause the computer to function as an evaluation unit configured to evaluate a plurality of players in the competitive game, and the determination unit may be configured to determine a player with the highest evaluation among the plurality of players as the player satisfying a predetermined condition for the competitive game during the progress of the competitive game.

According to this configuration, the BGM is changed each time the player with the highest evaluation is switched, so that the player can know that the player with the highest evaluation has switched by the change of BGM.

The evaluation unit may be configured to calculate a score of the competitive game for each of the plurality of players from time to time, and the determination unit may be configured to determine a player with the highest score among the plurality of players as the player satisfying the predetermined conditions for the competitive game during the progress of the competitive game.

According to this configuration, the BGM is chanced each time the player with the highest score switches, so that the player can know that the player with the highest score has switched by the change of the BGM.

The music output unit may configured to repeatedly output music pieces corresponding to the replacement of a player who satisfies the predetermined condition until the competitive game is finished.

According to this configuration, the above effect can be maintained until the game ends.

The music output unit may be configured to associate at least one of the plurality of first music pieces with each of the plurality of players at a predetermined timing at least until the competitive game is played.

According to this configuration, the first music piece to be associated with each player can be determined prior to the start of the competitive game.

Each of the plurality of players may be associated with a different first music piece from each other.

According to this configuration, since when a player becomes a player who satisfies the predetermined conditions, the BGM including the first music piece associated with himself/herself is output differently from other players, the player who himself herself a player satisfying the predetermined conditions can show off by BGM that he/she has become a player who meets the predetermined conditions.

The game execution unit may be configured to display an image that can identify players who satisfy the predetermined conditions on a display device.

According to this configuration, the user can effectively recognize that the progress of the game has changed by the image as well as the BGM.

The music output unit may be configured to cause a third music piece to be output instead of outputting the first music piece when two or more of the plurality of players satisfy the predetermined conditions.

According to this configuration, when more than one player satisfies the predetermined conditions, the third music piece can be output to indicate that more than one player satisfies the predetermined conditions.

The music output unit may be configured to repeatedly outputs the second music piece until a player satisfying the predetermined condition is replaced.

According to this configuration, the first music piece can be used as the intro music and the second piece of music can be output repeatedly.

The music output unit may be configured to increase a output speed of at least one of the first music piece and the second music piece to be output when the progress of the competitive game reaches a predetermined progress status.

According to this configuration, the player can know by the BGM that the progress of the competitive game has reached a predetermined progress status.

The music output unit may be configured to cause a plurality of second music pieces to be switched and output according to a predetermined order each time a player satisfying the predetermined conditions is replaced.

According to this configuration, the second music piece is output in order each time a player satisfying the predetermined condition is replaced.

The number of selectable second music piece is less than the maximum number of players who can participate in the competitive game.

According to this configuration, a variety of BGM can be output with a relatively small number of music pieces.

The first music piece is shorter than the second music piece.

According to this configuration, the first piece of music prepared for each player can be short, and this allows a variety of BGM to be output while reducing the burden of BGM creation.

The competitive game may be: a quiz game; a puzzle game; a racing game in which the evaluation is determined according to a speed of goal time or a distance traveled within a predetermined time; or a baffle game in whim the evaluation is determined according to damage points corresponding to attacks by other players or hit points corresponding to attacks on other players, and the predetermined condition used for determination of the determination unit may be a condition related to the evaluation. In the quiz game, each player's evaluation may be determined according to at least one of the following: the correctness of answers of the plurality of players; the speed of the answers; the number of correct answers within a predetermined time period; and the points earned within a predetermined time period. In the puzzle game, each player's evaluation may be determined according to at least one of the following: a speed of clear times of the each player; the number of clear times within a predetermined time period; and points earned within a predetermined time period.

According to this configuration, in each competitive game, the BGM can be switched according to the evaluation of the player.

An information processing apparatus in one aspect comprises: a competitive game execution unit configured to execute a competitive game in which a plurality of players participate; a determining unit configured to determine at least one player among the plurality of players who satisfies a predetermined condition relating to the competitive game during the progress of the competitive game; and a music output unit configured to output, during the progress of the competitive game, a first music piece associated with a player satisfying the predetermined conditions and output, after the first music piece, a second music piece to be selected regardless of a player satisfying the predetermined conditions, wherein the music output unit is configured to, when a player satisfying the predetermined condition is replaced during the progress of the game, cause the first music piece associated with the player newly satisfying the predetermined condition to be output, and after the first music piece, cause a second music piece different from the second music piece included in a music piece that was output before the player was replaced.

According to this configuration, the BGM is changed each time a player who satisfies the predetermined conditions for a competitive game is replaced, so that the BGM can be output in accordance with the game situation. The player can feel the change in the progress of the game by the change of the BGM. Furthermore, according to the above configuration, as BGM, after outputting the first music piece associated with a player who satisfies the predetermined conditions for a competitive game, the second music piece, which is selected regardless of the player, is output, and the second music piece is changed each time a player who satisfies the predetermined conditions is replaced. Therefore, it is possible to provide a variety of BGM without having to create many music pieces to be used as BGM.

The information processing apparatus may further comprise an evaluation unit configured to cause the computer to function as an evaluation unit configured to evaluate a plurality of players in the competitive game, wherein the determination unit may be configured to determine a player with the highest evaluation among the plurality of players as the player satisfying a predetermined condition for the competitive game during the progress of the competitive game.

The evaluation unit may be configured to calculate a score of the competitive game for each of the plurality of players from time to time, and the determination unit may be configured to determine a player with the highest score among the plurality of players as the player satisfying the predetermined conditions for the competitive game during the progress of the competitive game.

The music output unit may be configured to repeatedly output music pieces corresponding to the replacement of a player who satisfies the predetermined condition until the competitive game is finished.

An information processing system in one aspect comprises: a competitive game execution unit configured to execute a competitive game in which a plurality of players participate; a determining unit configured to determine at least one player among the plurality of players who satisfies a predetermined condition relating to the competitive game during the progress of the competitive game; and a music output unit configured to output, during the progress of the competitive game, a first music piece associated with a player satisfying the predetermined conditions and output, after the first music piece, a second music piece to be selected regardless of a player satisfying the predetermined conditions, wherein the music output unit is configured to, when a player satisfying the predetermined condition is replaced during the progress of the game, cause the first music piece associated with the player newly satisfying the predetermined condition to be output, and after the first music piece, cause a second music piece different from the second music piece included in a music piece that was output before the player was replaced.

According to this configuration, the BGM is changed each time a player who satisfies the predetermined conditions for a competitive game is replaced, so that the BGM can be output in accordance with the game situation. The player can feel the change in the progress of the game by the change of the BGM. Furthermore, according to the above configuration, as BGM, after outputting the first music piece associated with a player who satisfies the predetermined conditions for a competitive game, the second music piece, which is selected regardless of the player, is output, and the second music piece is changed each time a player who satisfies the predetermined conditions is replaced. Therefore, it is possible to provide a variety of BGM without having to create many music pieces to be used as BGM.

An information processing method in one aspect comprises: executing a competitive game in which a plurality of players participate; determining at least one player among the plurality of players who satisfies a predetermined condition relating to the competitive game during the progress of the competitive game; and outputting, during the progress of the competitive game, a first music piece associated with a player satisfying the predetermined conditions and output, after the first music piece, a second music piece to be selected regardless of a player satisfying the predetermined conditions, wherein the outputting is configured to, when a player satisfying the predetermined condition is replaced during the progress of the game, cause the first music piece associated with the player newly satisfying the predetermined condition to be output, and after the first music piece, cause a second music piece different from the second music piece included in a music piece that was output before the player was replaced.

According to this configuration, the BGM is changed each time a player who satisfies the predetermined conditions for a competitive game is replaced, so that the BGM can be output in accordance with the game situation. The player can feel the change in the progress of the game by the change of the BGM. Furthermore, according to the above configuration, as BGM, after outputting the first music piece associated with a player who satisfies the predetermined conditions for a competitive game, the second music piece, which is selected regardless of the player, is output, and the second music piece is changed each time a player who satisfies the predetermined conditions is replaced. Therefore, it is possible to provide a variety of BGM without having to create many music pieces to be used as BGM.

DETAILED DESCRIPTION OF NON-LIMITING EXAMPLE EMBODIMENTS

The game systems in embodiments of the present technology are described below with reference to the drawings. The embodiments described below are examples of the implementation of the present technology, and the present technology is not limited to the specific configurations described below. In implementing the present technology, specific configurations according to the embodiments may be adopted as appropriate.

In the embodiments described below, a person who operates a gaming device and plays a game is called a user, and a user recognized in a game is called a player. The player may appear as a character on the game screen, or the user who operates the gaming device and plays the game may be treated as a player in the game. Objects (vehicles, airplanes, etc.) operated by the user may also be considered as players.

First Embodiment

Figure 1:
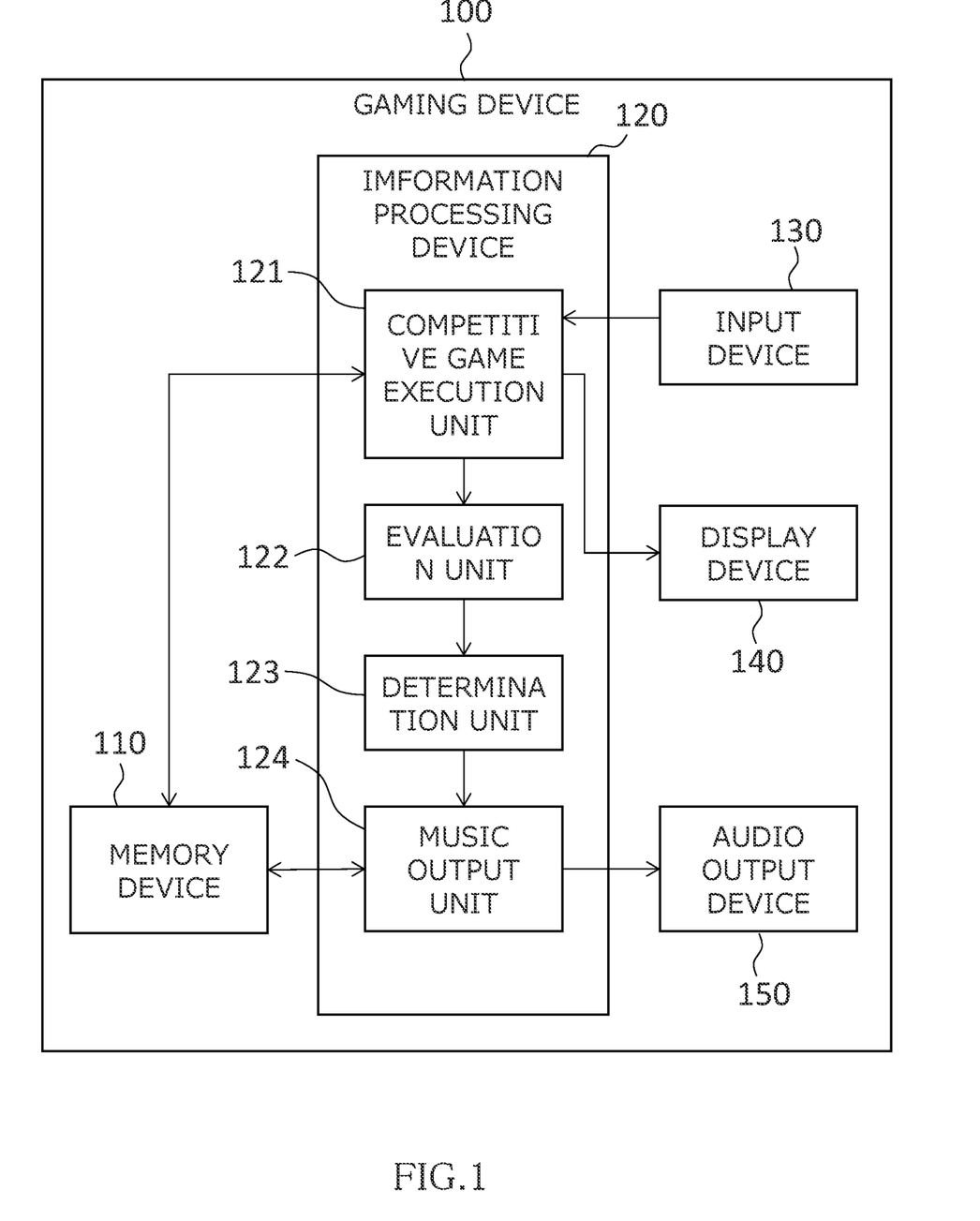
FIG. 1 is a block diagram of the information processing system, in the first embodiment.

FIG. 1 is a block diagram of the information processing system in the first embodiment. In this embodiment, the information processing system is configured as a gaming device that performs processing related to games. In this embodiment, the gaming device 100 executes, among other things, a competitive game in which multiple players participate. The gaming device 100 is equipped with a memory device 110, an information processing device 120, an input device 130, a display device 140 and an audio output device 150.

The input device 130 is a device by which a user participating in a competitive game makes inputs. The input device 130 may be a touch panel or a controller equipped with physical operation buttons and operation levers. The input device 130 may be integrally configured with the information processing device 120, etc., or it may be a device separate from the information processing device 120.

For example, the input device 130 may be a single touch panel integrally configured with the display device 140. In this case, a plurality of users participating in a competitive game may play the game by performing touch input to predetermined areas of this single touch panel. For example, the input device 130 may be controllers provided for each user and separate from the gaming device itself, including the information processing unit 120. In this case, each controller can communicate with the main unit of the gaming device including the information processing unit 120 wirelessly or by wire, and the controllers can receive operation inputs such as button operations from the user, generate operation signals indicating the received operation inputs, and transmits it to the main unit of the gaming device. The main unit of the gaming device receives operation signals from each controller.

The memory device 110 is a non-volatile memory device, e.g., ROM. The memory device 110 contains a music data file (hereinafter simply referred to as a "music file") that is output during a game as BGM along with various information for executing the game.

The information processing unit 120 performs information processing for executing a competitive game and for outputting a the music as BGM. The information processing device 120 executes the game program as an information processing program of this embodiment to progress the game in response to the input from the input device 130. To supply the gaming device 100 with the game program, the gaming device 100 may read it from a portable non-transitory storage medium such as a cartridge or download it via a communication network.

The information processing unit 120 is equipped with a processor, memory, and various interfaces, and the processor executes the game program using the memory to play the game based on the operation signals from the input device 130, displays the results of the game on the display device 140, and outputs a music piece corresponding to the results of the game on the audio output device 150. In this embodiment, the information processing device 120 provides multiple types of competitive games that can be played by multiple players.

The display device 140 is a display showing a display screen generated by the information processing device 120. The audio output device 150 is a device that outputs a music piece by playing a specified music file. The audio output device 150 outputs a music piece by playing a music file selected by the information processing unit 120 according to the game to be played during a competitive game. The music output during the competitive game is particularly referred to as background music (BGM).

The information processing device 120 includes a competitive game execution unit 121, an evaluation unit 122, a determination unit 123, and a music output unit 124. Each of these elements is a function realized by the information processing unit 120 executing the game program.

The competitive game execution unit 121 executes information processing for a competitive game. The competitive game execution unit 121 executes a competitive game according to the game program based on operation signals from the input device 140, and display screen reflecting the results is output to the display device 140.

Figure 2:
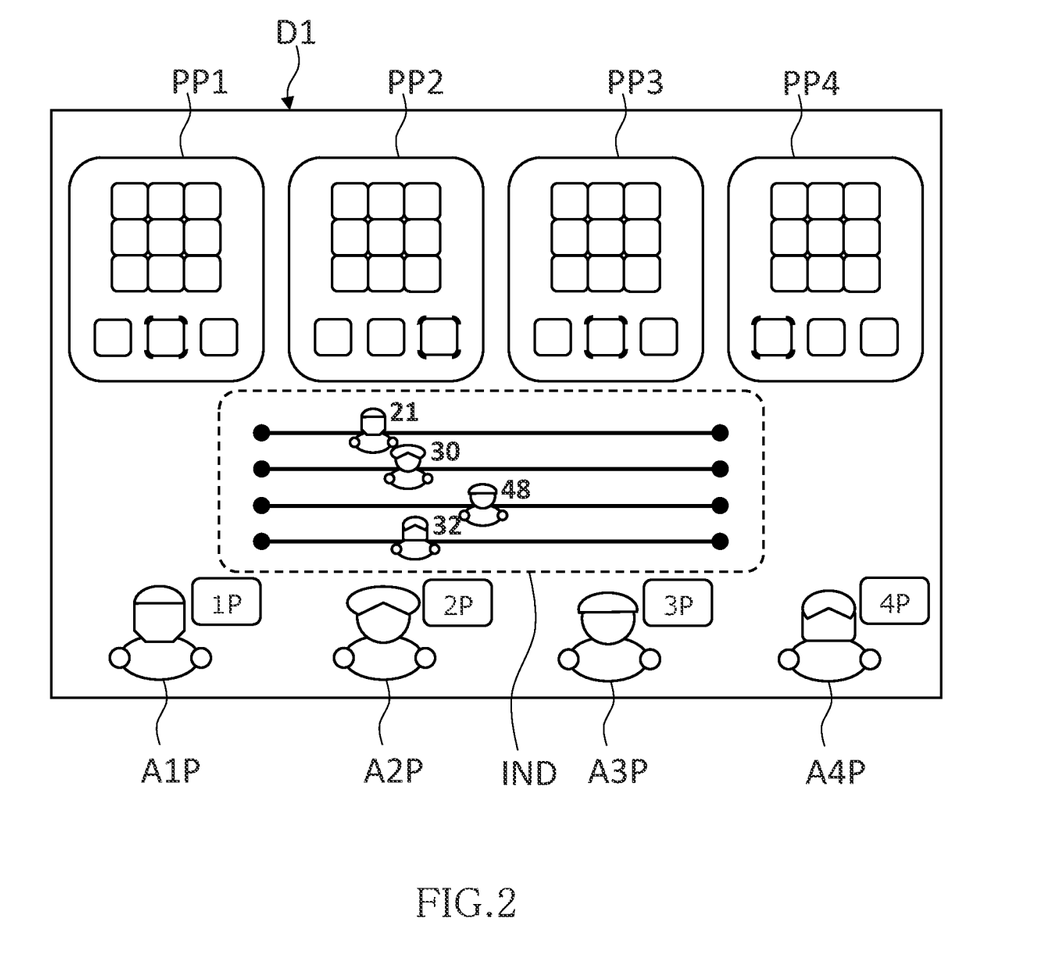
FIG. 2 shows an example of the display screen of the information processing system in the first embodiment.

FIG. 2 shows an example of a display screen of the information processing system in the first embodiment. Display screen D1 is shown on display device 140. The example in FIG. 2 is an example of a display screen for a puzzle game. In this example, the maximum number of multiple players who can participate in the competitive game is 4, and 4 participants (1P-4P) are participating. In other examples, the maximum number of players may be set to 5 or more.

The display screen D1 shows avatars A1P to A4P for each player, and puzzle panels PP1-PP4 are displayed corresponding to each player. The puzzle game consists of multiple rounds, and at the end of each round, each player is awarded points reflecting the result of that round, which is the player's score. In the example shown in FIG. 2, player 1P has got 21 points, player 2P has got 30 points, player 3P has got 48 points, and player 4P has got 32 points.

The display screen D1 further has an indicator IND that shows the status of the competitive game. The indicator IND shows the current points earned (score) in indicator form, and at a glance, it can be seen which player has got the highest score, i.e., which player is the top player. In this competitive game, the player who gets the predetermined number of points (100 points in this example) first wins. Therefore, during the game, the player with the most points is the top (leader) player. In the indicator IND, the points earned by each player are indicated by an indicator where the avatar image of each player advances on the rail by the distance corresponding to the points earned, and the top player is also indicated. In addition to or instead of this, the top player may be indicated directly. For example, the top player may be marked, or the top player's avatar image may flash, or other means may be used to indicate who the top player is.

In each round of the puzzle game, the evaluation unit 122 awards points to each player according to the game results of that round, and calculates the accumulated points (score). In a puzzle game, more points are awarded to the player who completes the puzzle more quickly.

The determination unit 123 determines which of the multiple players participating in the competitive game satisfies the conditions. As an example, in this embodiment, the determination unit 123 determines the player with the highest accumulated points calculated by the evaluation unit 122 as the top player (hereinafter referred to as the "top player"). In other words, the condition under which the determination unit 123 determines one player from multiple players is that the cumulative points calculated by the evaluation unit 122 is the highest among the plurality of players.

After the determination by the determination unit 123, the music output unit 124 selects a music file identified by the process described below from among the music files stored in the memory device 110, and directs the audio output device 150 to output the music file as BGM.

Figure 3:
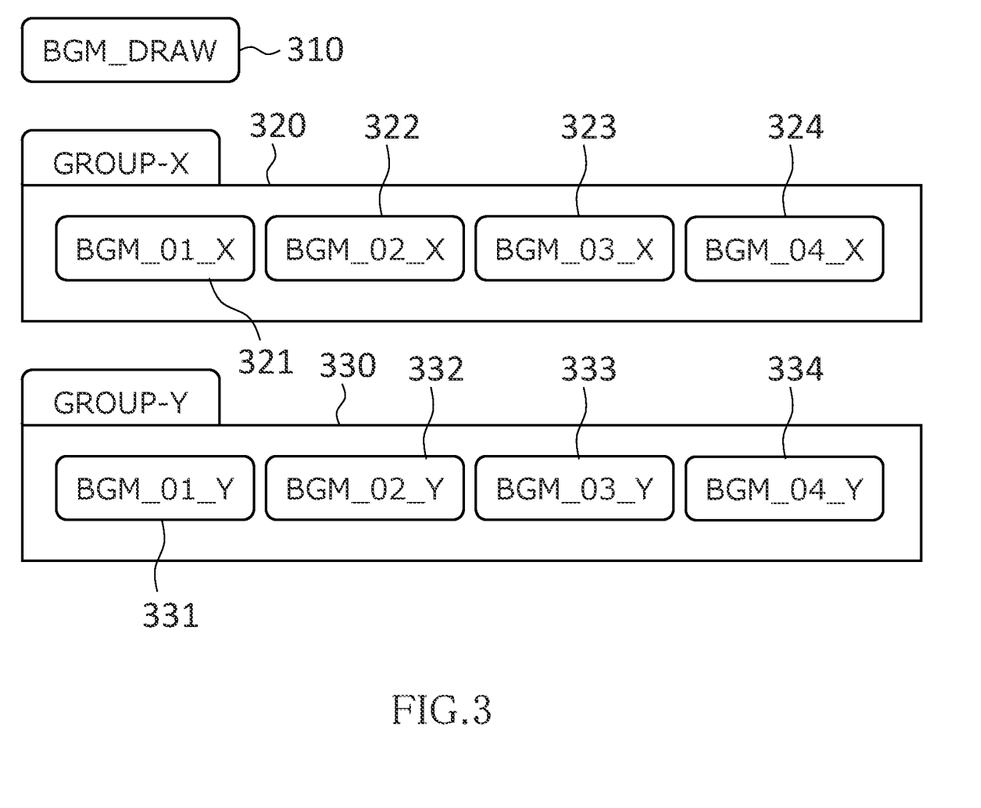
FIG. 3 shows a data structure of data stored in a memory device in the first embodiment.

FIG. 3 shows the data structure of the data stored in the memory device in the first embodiment. The memory device 110 stores music files for draw (BGM_Draw) 310, music files of X group 320, and music files for Y group 330 as music data files for BGM. The music files of X group 320 includes a first music piece (BGM_01_X) 321, a second music piece (BGM_02_X) 322, a third music file (BGM_03_X) 323, and a fourth music file (BGM_04_X) 324. The music files of Y group includes a first music piece (BGM_01_Y) 331, a second music piece (BGM_02_Y) 332, a third music file (BGM_03_Y) 333, and a fourth music file (BGM_04_Y) 334.

Here, each of the music files included in the X group 320 in this embodiment is one music file, but the music file is composed of music data including at least the first music piece and the second music piece each of the music files includes a first music piece that is associated with each player and a second music piece that is not associated with each player.

Figure 4:
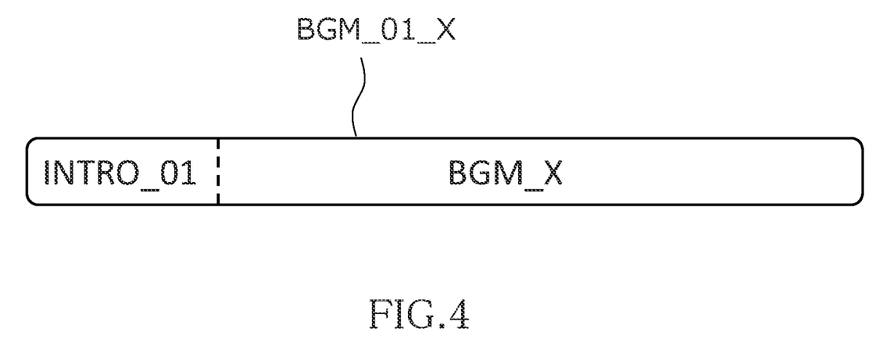
FIG. 4 illustrates the composition of the music files of the first embodiment.

FIG. 4 illustrates the composition of the music files of the first embodiment. In FIG. 4, a music file belonging to the X group 320 and associated with player 1P (BGM_01_X) 321 is shown, but other music files belonging to the X group 320 and Y group 330 have the same structure. As shown in FIG. 4, the music file (BGM_01_X) 321 is a file of music configured such that a first intro (INTORO_01) as the first music piece associated with the player IP is output, and after that the first main BGM (BGM_X) as the second music piece is output.

Similarly to the music file (BGM_01_X) 321 in FIG. 4, the music file (BGM_02_X) 322 is a file of music configured such that the second intro (INTORO_02) as the first music piece associated with the player 2P is output, and after that the first main BGM (BGM_X) as the second music piece is output. The same applies to the music file (BGM_03_X) 323 and the music file (BGM_04_X) 324. In other words, in the X group 320, in each music file, the first music piece is different for each player, but the second music piece that follows it is common.

Each of the music files in Y group 330 in this embodiment is also a single music file, and each music file contains at least a first music piece associated with each player and a second music piece that is not associated with each player. For example, the music file (BGM_01_Y) 331 is a file of music configured such that: the first intro (INTORO_01) as the first music piece associated with player 1P is output, and after that, the second main BGM (BGM_Y) as the second music piece is output; the second intro (INTORO_01) as the first music piece associated with player 1P is output, and after that, the second main BGM (BGM_Y) as the second music piece is output. The same applies to the music file (BGM_03_Y) 333 and the music file (BGM_04_Y) 334. In other words, also in Y group 330, the first music piece in each music file is different for each player, but the second music piece that follows it is common. In addition, the first music piece prepared for each player in Y group 330 is the same as the first music piece prepared for each player in X group 330.

In addition, the music file (BGM_Draw) 310 is a third music file that is different from the music of any of the music files.

The first music piece, which is associated with each player, is a short music and serves as an introduction when the music is switched. The second music piece, which is not associated with each player, is longer than the first music piece and functions as BGM while the game is in progress after the output of the first music piece. In other words, in order to prepare the music files to be stored in the memory device 110, four types of short music (first music piece) associated with each player have been created, and two types of second music piece have been created as the main BGM music following the intro. Furthermore, a music is created for use when multiple players have the same highest score. Thus, the music files created by the combination of the first music piece associated with each player and the second music piece not associated with a player are the multiple music files (BGM_01_X) 321, etc. as illustrated in FIG. 4. By creating multiple music files in this manner, as well as preparing music files when multiple players have the same highest score, and adjusting the order of output, a variety of BGM can be output even when a relatively small number of first and second music piece have been created.

Figure 5:
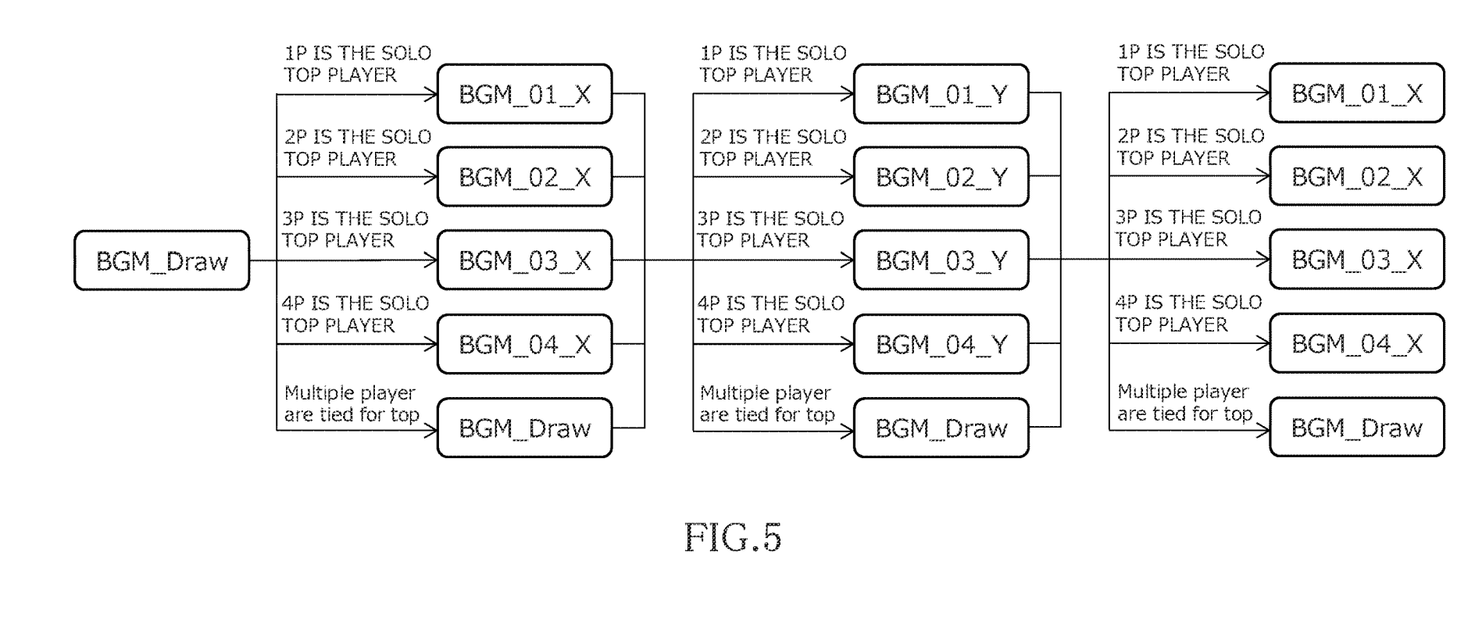
FIG. 5 shows a transition of an output music file after a game starts in the first embodiment.

FIG. 5 shows the transition of the output music files after the game starts in the first embodiment. When a game starts, the music output unit 124 causes the audio output device 150 to start outputting music files. Since all players are tied (0 points) at the start of the game, the music output unit 124 outputs the music file of the third music file that should be output when multiple players are tied for the top position (BGM_Draw) 310 is output. If, as the game progresses (e.g., at the timing when the first round ends), one of the players becomes the sole top player, the music output unit 124 receives a specification of the solo top player from the determination unit 123, select a music file corresponding to the solo top player, and directs the audio output unit 150 to output the music file.

At this time, at first, the music output unit 124 outputs the music files 321-314 of the X group 320 (i.e., BGM_01_X, BGM_02_X, BGM_03_X, BGM_04_X), depending on who the sole top player is. Although it is acceptable to select one of the music files from any of the music files in Y group 330 according to who the single top player is, for the sake of convenience, in this embodiment, at the timing when the change of the player with the top score occurs for the first time, priority is given to the output of the music file included in the X group. If multiple players are tied for the top score, the music output unit 124 continues to select (BGM_Draw) 310.

If the game progresses further (e.g., at the timing when the second round is finished) and the top player is replaced, the music output unit 124 receives the designation of the player who has replaced and become the top player from the determination unit 123, selects the music file corresponding to the player who has become the top player, and directs the audio output device 150 to output the music file to be output to the audio output device 150.

At this time, the music output unit 124 selects any of the music files 331-334 (that is, BGM_01_Y, BGM_02_Y BGM_03_Y, and BGM_04_Y) in the Y group 330, which includes the second music piece which is different from the second music piece being played before changing the top player, depending on who the sole top player is. If multiple players are tied for the no position, the music output unit 124 selects the music file (BGM_Draw) 310.

When the game progresses further (e.g., at the timing when the third round is finished) and the top player is replaced, the music output unit 124 receives the designation of the player who has replaced and become the top player from the determination unit 123, selects the music file corresponding to the player who has become the top player, and directs the audio output device 150 to output the music file to be output to the audio output device 150.

At this time, the music output unit 124 selects any of the music files 321-324 (that is, BGM_01_X, BGM_02_X BGM_03_X, and BGM_04_X) in the X group 320, which includes the second music piece which is different from the second music piece being played before changing the top player, depending on who the sole top player is. If multiple players are tied for the top position, the music output unit 124 selects the music file (BGM_Draw) 310.

Thus, each time the top player (highest score among multiple players) changes, the music file to be output is switched so that the second music piece to be output is different. In this embodiment, the music files are selected alternately from X Group 320 and Y Group 330, and the second music piece in the music file is different between X group 320 and Y group 330. In this way, each time the top player changes, the music files to be output are switched so that the second music piece included in the music files to be output is different. In other words, the music output unit 124 switches the music file to be output so that each time the top player changes, two types of the second music piece (the second music piece used in the X group 320 and the second music piece used in the Y group 330) are included in the music file to be output in a predetermined order and have them, output. Furthermore, among the music files included in the selected group, the music file including the first music piece corresponding to the player who became the top player is selected as appropriate and output. The music output unit 124 continues this process until the end of the competitive game.

If the output of the music file is completed before the top player has switched, the music output unit 124 causes the audio output device 150 to repeatedly output the music file. However, when repeatedly outputting the music file, the music output unit 124 specifies the position in the music file where the second music piece starts so that only the second music piece is repeatedly output. As a result, the first music piece associated with the top player is output at the timing when the top player is switched, and the second music piece is repeatedly output thereafter.

When the game is nearing its end, the music output unit 124 instructs the audio output device 150 to increase the output speed (tempo) of the music file. Specifically, if the competitive game ends when one of the players has obtained the predetermined target points (e.g., 100 points), the music output unit 124 may speed up the output speed of the music file when either player has earned a predetermined number of points (e.g., 80 points) or more. In the case where the game ends when the predetermined game time (e.g., 2 minutes) elapses, the music output unit 124 may speed up the output of the music file when the predetermined time (e.g., 1 minute and 40 seconds) from the start of the game elapses. When the game ends after a predetermined number of scheduled rounds (e.g., 5 rounds), the music output unit 124 may speed up the output of the music file when the number of rounds that have already ended reaches the predetermined number of rounds (e.g., 4 rounds).

The first music piece is assigned to each player participating in the competitive game before the competitive game starts. The first music piece may be assigned to each player in the order of entry into the competitive game. The first music piece may also be assigned to each player by each player's own selection. In this case, the same first music piece may or may not be allowed to be assigned to multiple players in duplicate. Furthermore, the first music piece may be randomly assigned to each player. The assignment of the first music piece to each player is stored in the music output unit 124.

Figure 6:
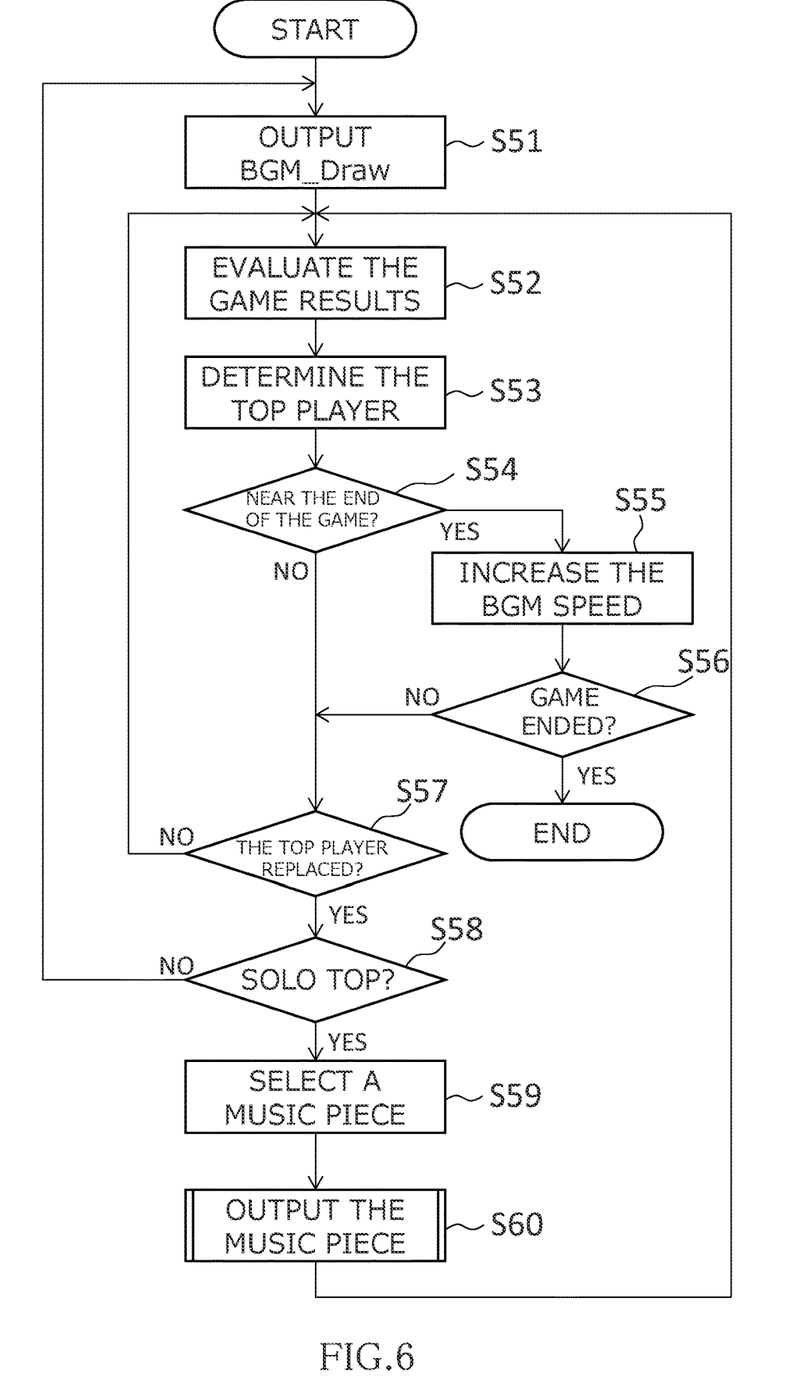
FIG. 6 is a flowchart of an information processing method in the first embodiment.

FIG. 6 is a flowchart of the information processing method in the first embodiment. When a competitive game is started by the competitive game execution unit 121, the music output unit 142 reads out the music file (BGM_Draw) 310, which is to be output when multiple players are tied for the top position, from the memory device 110 and output it to the audio output unit 150, and the audio output unit 150 outputs this music file (step S51).

The evaluation unit 122 evaluates the game results of each player in the competitive game, grants points to each player according to the game rules of the competitive game, and calculates the accumulated points granted (step S52). The determination unit 123 determines the player with the highest accumulated points calculated by the evaluation unit 122 to be the top player satisfying the condition (step S53).

The music output unit 124 determines whether or not the game satisfies the predetermined conditions for judging whether near the end of the game (e.g., the highest score is above a predetermined point, the elapsed time is above a predetermined time, the number of rounds conducted is above a predetermined number of rounds, etc.) (step S54). If the predetermined conditions for judging whether near the end are met (YES in step S54), the music output unit 124 instructs the audio output unit 150 to increase the speed of the output (Step S55). Next, the competitive game execution unit 121 determines whether the game has ended (step S56), and if the game has ended (YES in step S56), the process ends.

If the game does not meet the predetermined conditions for judging whether near the end (NO in step S54), or if the game meets the predetermined conditions for judging whether near the end but the competitive game has not yet ended (NO in step S56), the determination unit 123 determines whether or not the top player has been replaced based on the accumulated points of each player calculated by evaluation unit 122 (step S57).

If the evaluation unit 123 determines that the top player has not been replaced (in step S57 NO), the process returns to step S52, where the evaluation unit 122 evaluates the game player is evaluated according to the results. If the top player has been replaced (YES in step S57), the music output unit 124 determines whether the top player is alone or multiple players are tied for the top position (step S58).

If the top player is alone (YES in step S58), the music out; unit 124 executes the process for changing the music file to be output. In changing the music file, as described above, the music file is changed so that the first music piece included in the newly output music file is the first music piece associated with the player who becomes the new top player, and the second music piece included in the newly output music file is different from the second music piece that was output before the top player was replaced. In this embodiment, when changing the music file to be output, the music file associated with the player who newly becomes the top player is selected from the music files included in a group different from the group that includes the music file that was output before the top player was replaced (step S59).

Here, as described above, for example, the music files included in the X group 320 include a common second music piece (BGM_X), and the music files included in the Y group 330 include a common second music piece (BGM_Y). Therefore, when the music file that was output before the top player was changed is included in X group 320, by changing a group which includes the music file to be output next from X group 320 to Y group 330, the second music piece (BGM_X) included in the music file that was output before the top player was changed will be changed to a different type of second music piece (BGM_Y) than that included in the music file that was output before the top player was changed. Also, when the music file that was output before the top player was changed is included in Y group 330, by changing a group which includes the music file to be output next from Y group 330 to X group 320, the second music piece (BGM_Y) included in the music file that was output before the top player was changed will be changed to a different type of second music piece (BGM_X) than that included in the music file that was output before the top player was changed.

Then, the music output unit 124 selects a music file according to who the top player is from the plurality of music files included in the selected group (step S59). The music output unit 124 directs the audio output device 150 to output the music file selected by the above process (step S60). At this time, if an increase in the tempo of output is indicated in step S55, the audio output device 150 outputs the specified music file is output at an up-tempo.

Next, the process returns to the step S52, the evaluation unit 122 evaluates the plurality of players based on the game results.

Figure 7:
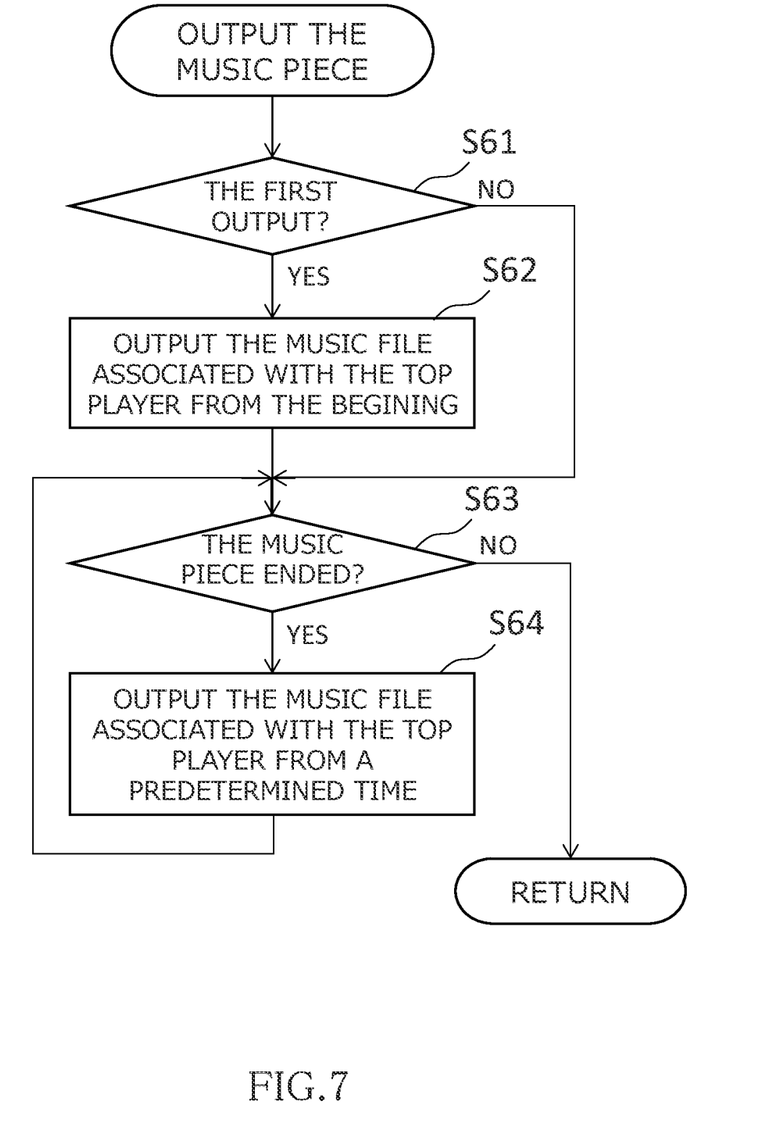
FIG. 7 is a flowchart of the output step of the music file of the information processing method in the first embodiment.

FIG. 7 is a flowchart of the output step of the music file of the information processing method in the first embodiment. The flowchart of FIG. 7 is executed as a subroutine of step S60 in FIG. 6. The music output unit 124 first determines whether the output of the music file is the first output after switching the music file (step S61). If it is the first output, the music file which includes the first music piece associated with the top player and the second music piece designated regardless of the top player, and selected by the process of step S59 is output from the beginning (step S62). Then, the music output unit 124 determines whether the output of the music file has been completed (output to the end) (step S63).

If the output of the music file is not finished, the process returns to step S60 in FIG. 6. If the music piece has finished (YES in step S63), the music output unit 124 output the music file selected in step S62 from a predetermined time when the second music piece starts (the first music pieces) (step S64), and the process returns to step S63, the music output unit 124 determines whether or not the output of the music file has been completed.

As described above, according to the gaming device 100 in this embodiment, the first music pieces that serves as an introduction for each of the four players are created, and two types of second music pieces that serve as BGM are created, and by combining them, eight types of music files can be prepared. When the top player is changed, a music file including the first music piece associated with the top player as an intro is output, so that the players can recognize who has switched to the top position by the intro, and since a music file containing a different main BGM (second music piece) than that before the switch is output following the introduction, the players can recognize that the game phase has changed (the top player has been switched). In particular, in this embodiment, a smaller number of second music pieces are created than the maximum number of players who can participate in a competitive game, and multiple groups are created for each music file containing a common second music piece.

Second Embodiment

In the first embodiment, the music files each comprising a combination of the first music piece and the second music piece was stored in the memory device 110. However, music files of the first music piece and music files of the second music piece may be stored in the memory device 110 as separate files.

Figure 8:
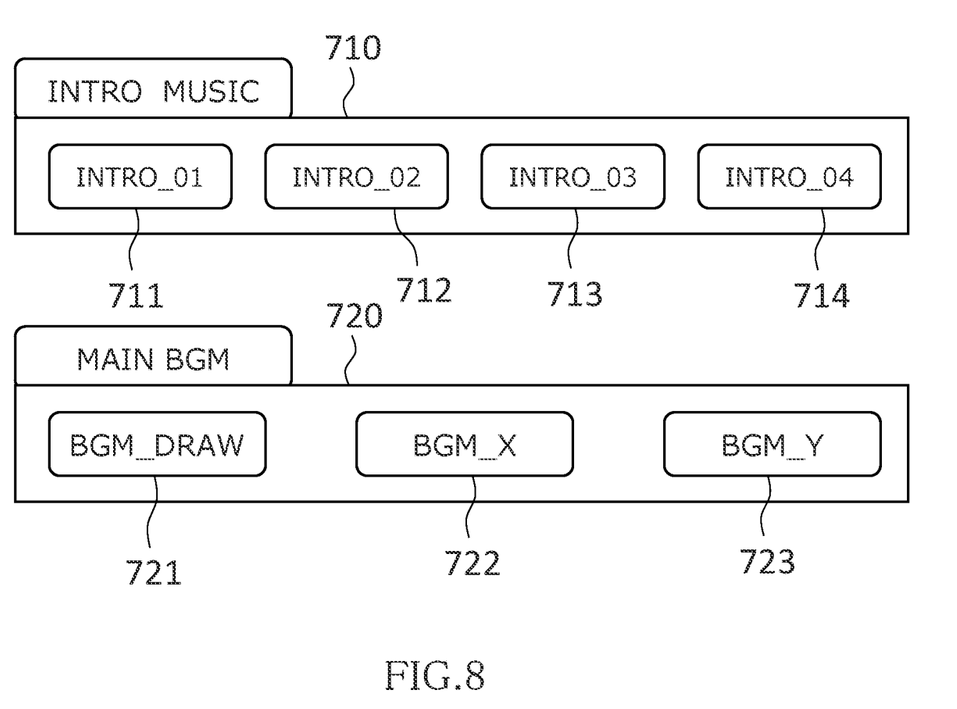
FIG. 8 shows the data structure of the data stored in the memory device in the second embodiment.

FIG. 8 shows the data structure of the data stored in the memory device in the second embodiment. The memory device 110 stores music files (intro files) 710 of the intro music, which is the first music piece associated with each player and a music file (main BGM (main BGM file) 720 of main BGM, which is the second music piece, A music file (INTRO_01) 711, a music file (INTRO_02) 712, a music file (INTRO_03) 713, and a music file (INTRO_04) 714, which are the first music pieces, are stored as the intro files 710, and a music file (BGM_Draw) 721, a music file (BGM_X) 722, and a music file (BGM_Y), which are the second music pieces, are stored as the main BGM file 720.

The music output unit 124 instructs the audio output device 150 to output audio according to the determination result in the determination unit 123, At this time, if multiple players are tied for the top position, the music output unit 124, as in the first embodiment, instructs to output the music file (BGM_Draw) 721. If any player is the top player alone, the music output unit 124 selects the intro music associated with that player from the intro files 710, and also selects the music file (BGM_X) 722 or the music file (BGM_Y) 723 from the main BGM files 720 and instructs the audio output unit 150 to output it.

Each time the top player is replaced and gives new instructions to the audio output device 150, the music output unit 124 changes the main BGM file. In other words, if the music file (BGM_X) 722 is output as the main BGM file first then the music output unit 124 instructs to output the music file (BGM_Y) 723 as the next main BGM file, and if the music file (BGM_Y) 723 is output as the main BGM file first, then the music output unit 124 instructs to output the music file (BGM_X) as the next main BGM file.

The audio output device 150 outputs the specified music file from the music output unit 124. At this time, the audio output device 150 outputs the music file (BGM_X) 722 as the BGM file repeatedly when multiple players have tied for the top position and the music file (BGM_X) 721 is directed. In addition, when one of the players becomes the sole top player, and one of the intro music files and one of the main BGM music files (either BGM_X or BGM_Y) are indicated, the audio output device 150 output the intro music file first and then output the main BGM music file, and after that, output the main BGM music file repeatedly until the player at the top is replaced.

Variant

In the above embodiments, as described above, two types of the second music pieces, which are the main BGM, are prepared, and they are output alternately each time the top player is replaced, whereas an experiment has shown that users do not have the impression that the same BGM is repeated every other time, but rather that the phase has changed. Therefore, it is sufficient to prepare two types of second music piece. However, three or more types of second music piece may be used. When more than three types of second music pieces are used, the second music piece to be output may be selected randomly. Furthermore, even in this case, the restriction that a different group be selected than before the switchover may be established.

In addition, in the above embodiments, a music file (BGM_Draw) is prepared as the BGM when multiple players are tied for the top position, and the music file is output in case where multiple players are tied for the top position including the period from the start of the competitive game until the sole top player is determined, whereas it is not necessary to prepare the BGM for the case where multiple players are tied for the top position. In this case, for example, at the start of the game, in the first embodiment, the output may begin at the start of the second music piece in either X Group 320 or Y Group 330, and once one of the players becomes the sole top player, repeat output of the second music piece may continue according to the flow shown in FIG. 7 until another player becomes the sole top player, including cases where multiple players are tied for the top position.

In the above embodiments, an example in which the competitive game is a puzzle game is described, but the competitive game may be a quiz game, a racing game, a battle game, etc., other than a puzzle game. In the case of a puzzle game, as described above, the evaluation unit 122 determines the evaluation according to at least one of the following: how fast the multiple players clear time, the number of clears within a predetermined time, or the points earned within a predetermined time. In the case of a quiz game, the evaluation unit 122 determines the evaluation of each player according to at least one of the following: the correctness of the multiple players' answers, thee speed of the answers, the number of correct answers within a predetermined time, and the points earned within a predetermined time. In the case of a racing game, the evaluation unit 122 determines the evaluation according to the speed of the goal time or the distance traveled within a predetermined time. In the case of a battle game, the evaluation unit 122 determines the rating according to the damage points from attacks from other players or the hit points from attacks on other players. The determination unit 123 determines that the player with the highest evaluation by the evaluation unit 122 is the player who satisfies the predetermined conditions.

The competitive game does not have to be a game in which a plurality of players play against each other, but may be a game in which a plurality of players play against a common opponent. In this case, the evaluation unit 122 may evaluate the degree of contribution to win against the opponent for each player, and the determination unit 123 may determine the player with the highest degree of contribution to be the player who satisfies the condition. For example, in the case of a game in which multiple players cooperate to battle an enemy character, the determination unit 123 may determine that the player who inflicts the most damage to the enemy character is the player who satisfies the condition.

Furthermore, in a competitive game, some players may be players controlled by the competitive game processing unit 121. For example, if player 1P is the only player controlled by the user, and players 2P-4P may be players who participate in a competitive game under the control of the competitive game processing unit 121. The competitive game may also be conducted by less than the maximum number of players who can participate (e.g., 2 or 3 players in the above embodiment where the maximum number of players who can participate is 4).

In the above embodiment, the determination unit 123 determines the player with the highest evaluation by the evaluation unit 122 to be the player who satisfies the condition. However, the criteria for determination by the determination unit 123 are not limited to this. For example, the determination unit 123 may determine the player with the lowest evaluation by the evaluation unit 122 to be the player who satisfies the condition.

For example, if a competitive game consists of multiple rounds of games and a rule is set that the lowest ranked player is eliminated in each round and the player who survives to the end is the winner, since attention is paid to which player is the lowest ranked, it is effective that the determination unit 123 changes the music file to be output each time the lowest ranked player is replaced.

The determination unit 123 may also determine that a player whose score increase is greater than a predetermined value is a player who satisfies the condition. In the case where the competitive game consists of multiple rounds, the determination unit 123 may determine, at the end of each round, the player who had the highest score in the immediately preceding round as the player who satisfies the condition.

In the above embodiment, the first music piece is the intro music, and the second music piece, which is the main BGM music, is output after the first music piece. However, the first music piece and the second music piece may be output simultaneously. For example, if one of the first and second tracks is a piano track and the other is a drum track, multiple first tracks and multiple second tracks can be created and combined to provide a variety of tracks. The first music piece may also be called a sound effect, jingle, sound logo, etc.

In the above embodiment, a first music piece is associated with each player, and when the top player is replaced, the first music piece associated with the top player is output, followed by the second music piece, but instead of the first music piece, an effect for the second piece may be associated with each player. This effect may be, for example, a tone of the second music piece (piano sound, electronic organ sound, flute sound, etc.).

Although the first music piece is associated with each player in the above embodiments, the first music piece may not be fixedly used for each player. For example, the first music piece may be switched in the same manner as the second music piece is a predetermined order or randomly as the top player is replaced.

In the above embodiment, one first music piece was assigned and associated with each player, but multiple first music pieces may be associated with one player, and when that player becomes the top player, the first piece may be selected from the multiple first pieces associated with that player in order or at random and output.

The gaming device 100 of the above embodiment may consist of a dedicated gaming device capable of executing various games by selecting game software, or it may be a general-purpose computer that has game execution functions by executing a game program.

Each element as an information processing system may be integrally configured as a gaming device 100, or some elements may be connected through a communication network. For example, multiple users may participate in a competitive game online via a communication network. In this case, a gaming system as the information processing system can consist of the plurality of gaming devices. In this case, the information processing unit 120 of each gaming device 100 of multiple users online performs the above process and synchronizes with the other gaming devices 100 via a communication network. Alternatively, any one of the plurality of gaming devices 10 may serve as a host machine, and the above processing may be performed by the information processing unit 120 of the host machine.

The invention claimed is:

1. A non-transitory storage medium having stored therein an information processing program executable by a computer, the information processing program, when executed, causing the computer to perform operations comprising:
   executing a competitive game in which a plurality of players participate;
   determining at least one player among the plurality of players who satisfies a predetermined condition relating to the competitive game during the progress of the competitive game; and
   outputting, during the progress of the competitive game, a first music piece associated with a player satisfying the predetermined condition and outputting, after the first music piece, a second music piece to be selected regardless of a player satisfying the predetermined condition, wherein
   when a player satisfying the predetermined condition is replaced in a ranking during the progress of the game, the first music piece associated with the player newly satisfying the predetermined condition is output for each of the plurality of players, and after the first music piece, a second music piece different from the second music piece included in a music piece that was output before the player was replaced is output for each of the plurality of players.

2. The non-transitory storage medium according to claim 1, wherein:
   the plurality of players in the competitive game are evaluated, and
   a player with the highest evaluation among the plurality of players is determined to be the player satisfying a predetermined condition for the competitive game during the progress of the competitive game.

3. The non-transitory storage medium according to claim 2, wherein:
   a score of the competitive game is calculated for each of the plurality of players from time to time, and
   a player with the highest score among the plurality of players is determined to be the player satisfying the predetermined conditions for the competitive game during the progress of the competitive game.

4. The non-transitory storage medium according to claim 1, wherein music pieces corresponding to the replacement of a player who satisfies the predetermined condition are repeatedly output until the competitive game is finished.

5. The non-transitory storage medium according to claim 1, wherein at least one of the plurality of first music pieces is associated with each of the plurality of players at a predetermined timing at least until the competitive game is played.

6. The non-transitory storage medium according to claim 1, wherein an image that can identify players who satisfy the predetermined conditions is displayed on a display device.

7. The non-transitory storage medium according to claim 1, wherein a third music piece is output instead of outputting the first music piece when two or more of the plurality of players satisfy the predetermined conditions.

8. The non-transitory storage medium according to claim 1, wherein the second music piece is repeatedly output until a player satisfying the predetermined condition is replaced.

9. The non-transitory storage medium according to claim 1, wherein an output speed of at least one of the first music piece and the second music piece to be output is increased when the progress of the competitive game reaches a predetermined progress status.

10. The non-transitory storage medium according to claim 1, wherein a plurality of second music pieces are switched and output according to a predetermined order each time a player satisfying the predetermined conditions is replaced.

11. The non-transitory storage medium according to claim 1, wherein the number of selectable second music piece is less than the maximum number of players who can participate in the competitive game.

12. The non-transitory storage medium according to claim 1, wherein the first music piece is shorter than the second music piece.

13. The non-transitory storage medium according to claim 1, wherein the competitive game is:
   a quiz game in which each player's evaluation is determined according to at least one of the following:
      the correctness of answers of the plurality of players;
      the speed of the answers;
      the number of correct answers within a predetermined time period; and
      the points earned within a predetermined time period;
   a puzzle game in which each player's evaluation is determined according to at least one of the following:
      a speed of clear times of the each player;
      the number of clear times within a predetermined time period; and
      points earned within a predetermined time period;
   a racing game in which the evaluation is determined according to a speed of goal time or a distance traveled within a predetermined time; or
   a battle game in which the evaluation is determined according to damage points corresponding to attacks by other players or hit points corresponding to attacks on other players; and
   wherein the predetermined condition used for the determination is a condition related to the evaluation.

14. The non-transitory storage medium according to claim 1, wherein the first music piece is different for each of the plurality of players, and the second music piece is common to each of the plurality of players.

15. An information processing apparatus, comprising:
   an output device; and
   processing circuitry including at least one processor, wherein the processing circuitry is configured to:
      execute a competitive game in which a plurality of players participate;
      determine at least one player among the plurality of players who satisfies a predetermined condition relating to the competitive game during the progress of the competitive game; and
      output, during the progress of the competitive game and using the output device, a first music piece associated with a player satisfying the predetermined condition and output, after the first music piece and using the output device, a second music piece to be selected regardless of a player satisfying the predetermined condition,
      wherein when a player satisfying the predetermined condition is replaced in a ranking during the progress of the game, the first music piece associated with the player newly satisfying the predetermined condition is output for each of the plurality of players, and after the first music piece, a second music piece different from the second music piece included in a music piece that was output before the player was replaced is output for each of the plurality of players.

16. The information processing apparatus according to claim 15, wherein the information processing apparatus is further caused to evaluate the plurality of players in the competitive game, and
   wherein a player with the highest evaluation among the plurality of players is determined to be the player satisfying a predetermined condition for the competitive game during the progress of the competitive game.

17. The information processing apparatus according to claim 16, wherein
   a score of the competitive game is calculated for each of the plurality of players from time to time, and
   a player with the highest score among the plurality of players is determined to be the player satisfying the predetermined conditions for the competitive game during the progress of the competitive game.

18. The information processing apparatus according to claim 16, wherein music pieces corresponding to the replacement of a player who satisfies the predetermined condition are repeatedly output until the competitive game is finished.

19. An information processing system, comprising:
   at least one processor; and
   a memory configured to store computer readable instructions that, when executed by the at least one processor, cause the information processing system to:
      execute a competitive game in which a plurality of players participate;
      determine at least one player among the plurality of players who satisfies a predetermined condition relating to the competitive game during the progress of the competitive game; and
      output, during the progress of the competitive game, a first music piece associated with a player satisfying the predetermined condition and outputting, after the first music piece, a second music piece to be selected regardless of a player satisfying the predetermined condition,
      wherein when a player satisfying the predetermined condition is replaced in a ranking during the progress of the game, the first music piece associated with the player newly satisfying the predetermined condition is output for each of the plurality of players, and after the first music piece, a second music piece different from the second music piece included in a music piece that was output before the player was replaced is output for each of the plurality of players.

20. An information processing method, comprising:

executing a competitive game in which a plurality of players participate;

determining at least one player among the plurality of players who satisfies a predetermined condition relating to the competitive game during the progress of the competitive game; and outputting, during the progress of the competitive game, a first music piece associated with a player satisfying the predetermined condition and output, after the first music piece, a second music piece to be selected regardless of a player satisfying the predetermined condition, wherein in association with a player satisfying the predetermined condition being replaced in a ranking during the progress of the game, the first music piece associated with the player newly satisfying the predetermined condition to is output for each of the plurality of players, and after the first music piece, a second music piece different from the second music piece included in a music piece that was output before the player was replaced is output for each of the plurality of players.

* * * * *